US012576985B2

(12) United States Patent
Scoscini et al.

(10) Patent No.: US 12,576,985 B2
(45) Date of Patent: Mar. 17, 2026

(54) DISPLAY SYSTEM WITH IMPROVED RELIABILITY

(71) Applicant: LEONARDO S.P.A., Rome (IT)

(72) Inventors: Stefano Scoscini, Rome (IT);
Giancarlo Cinti, Rome (IT); Raffaele Navarra, Rome (IT); Gabriele Cascino, Rome (IT); David Cellitti, Pomezia (IT)

(73) Assignee: LEONARDO S.P.A., Rome (IT)

( * ) Notice: Subject to any disclaimer, the term of this patent is extended or adjusted under 35 U.S.C. 154(b) by 94 days.

(21) Appl. No.: 18/715,973

(22) PCT Filed: Dec. 12, 2022

(86) PCT No.: PCT/IB2022/062080
§ 371 (c)(1),
(2) Date: Jun. 3, 2024

(87) PCT Pub. No.: WO2023/111820
PCT Pub. Date: Jun. 22, 2023

(65) Prior Publication Data
US 2025/0033792 A1 Jan. 30, 2025

(30) Foreign Application Priority Data

Dec. 15, 2021 (EP) .................................... 21425067
May 2, 2022 (IT) ........................ 102022000008837

(51) Int. Cl.
*B64D 43/00* (2006.01)
*G01C 23/00* (2006.01)
*G06F 3/147* (2006.01)

(52) U.S. Cl.
CPC ........... *B64D 43/00* (2013.01); *G01C 23/005* (2013.01); *G06F 3/147* (2013.01)

(58) Field of Classification Search
None
See application file for complete search history.

(56) References Cited

U.S. PATENT DOCUMENTS

2019/0147281 A1 5/2019 Atac et al.
2019/0286115 A1 9/2019 Wang
2019/0347943 A1* 11/2019 Pesik ....................... G08G 5/21

OTHER PUBLICATIONS

International Preliminary Report on Patentability for International Application No. PCT/IB2022/062080 mailed May 23, 2024.
(Continued)

*Primary Examiner* — Frank S Chen
(74) *Attorney, Agent, or Firm* — Ballard Spahr LLP

(57) ABSTRACT

Display system for a vehicle operable by a user, the display system comprising: a graphics generator configured to acquire input safety critical data indicative of one or more operative parameters of the vehicle and generate, based on the input safety critical data, an intermediate video frame signal indicative of an intermediate video frame, wherein the intermediate video frame comprises a first frame region that is a visual representation of monitoring safety critical data and that includes encoding markers uniquely associated to the monitoring safety critical data, wherein the monitoring safety critical data and the input safety critical data reciprocally correspond in a condition of correct working of the graphics generator and do not reciprocally correspond in a condition of incorrect working of the graphics generator; a display control unit coupled to the graphics generator and configured to receive the intermediate video frame signal and determine the monitoring safety critical data based on the encoding markers; a display monitoring unit coupled to the display control unit and configured to receive both the input safety critical data and the monitoring safety critical data determined from the encoding markers, reciprocally compare the input safety critical data and the monitoring
(Continued)

safety critical data and generate a command signal based on said comparison, the command signal being indicative of the correspondence, or of the lack of correspondence, between the input safety critical data and the monitoring safety critical data, wherein the display control unit is further configured to receive the command signal and, based on the command signal and the intermediate video frame and if the input safety critical data and the monitoring safety critical data correspond, generate a confirmed video frame signal indicative of a confirmed video frame that is configured to be displayed to the user and that is a visual representation of the monitoring safety critical data.

14 Claims, 6 Drawing Sheets

(56) References Cited

OTHER PUBLICATIONS

International Search Report and Written Opinion from International Application No. PCT/IB2022/062080 mailed Feb. 15, 2023.

Wang , "Detecting Hazardously Misleading Information on Safety-Critical Displays", 38th Digital Avionics Systems Conference (DASC), Sep. 8, 2019, pp. 1-5.

Reply to Second Written Opinion for International Application No. PCT/IB2022/062080 filed Dec. 27, 2023.

Reply to Written Opinion for International Application No. PCT/IB2022/062080 filed Oct. 6, 2023.

Written Opinion from International Application No. PCT/B2022/062080 mailed Oct. 30, 2023.

* cited by examiner

40a′

Figures 8, 9:
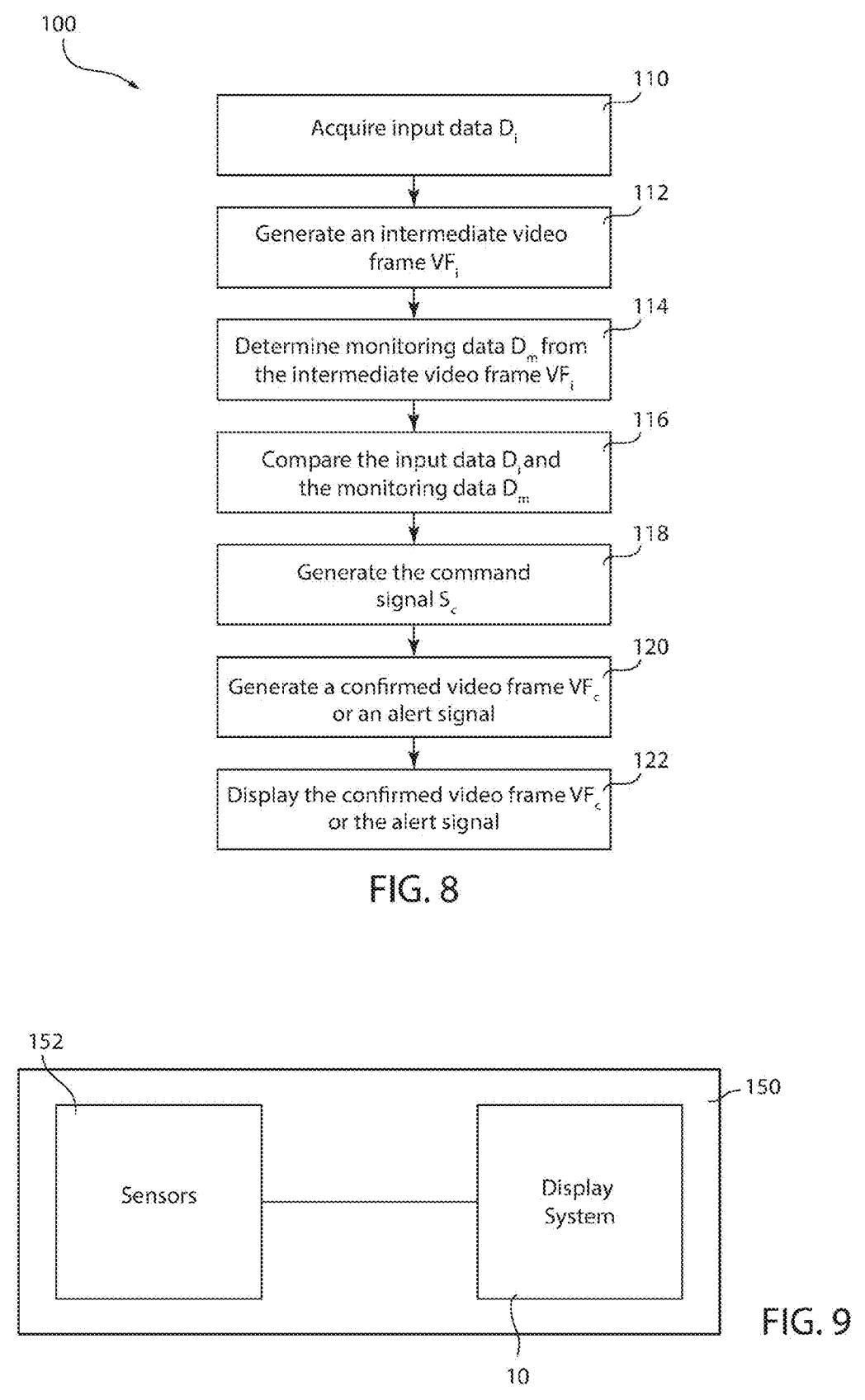

100

110

Acquire input data $D_i$

112

Generate an intermediate video frame $VF_i$

114

Determine monitoring data $D_m$ from the intermediate video frame $VF_i$

116

Compare the input data $D_i$ and the monitoring data $D_m$

118

Generate the command signal $S_c$

120

Generate a confirmed video frame $VF_c$ or an alert signal

122

Display the confirmed video frame $VF_c$ or the alert signal

Sensors

Display System

DISPLAY SYSTEM WITH IMPROVED RELIABILITY

CROSS-REFERENCE TO RELATED APPLICATIONS

This Patent Application is a U.S. national stage of PCT International Application No. PCT/IB2022/062080 filed on Dec. 12, 2022, which claims priority from European Patent Application No. 21425067.2 filed on Dec. 15, 2021 and from Italian Patent Application No. 102022000008837 filed on May 2, 2022 the entire disclosure of each of which is incorporated herein by reference.

TECHNICAL FIELD

The present invention concerns a display system with improved reliability. It also relates to a method for displaying safety critical data and to a vehicle comprising the display system, in particular an aircraft. The present invention finds its preferred, although not exclusive, application in the aerospace field, in particular in displaying primary flight display data.

BACKGROUND OF THE INVENTION

Modern airplane and helicopter cockpits include digital display systems that allow to implement a Human Machine Interface (HMI), enabling a pilot to perform actions such as navigating and controlling the aircraft as well as exploiting missions.

The HMI technology is commonly based on symbol generators hosting COTS ("Commercial Off The Shelf") GPUs ("Graphics Processing Units") or proprietary Raster Controller devices.

Currently, in order to reduce the overall costs of HMI, industry is relying more widely on COTS GPUs also for the displaying of safety critical data. In particular, modern aircraft cockpit displays use COTS GPU-based systems to render graphics of the pilot's HMI. Being COTS GPUs devices not specifically designed for the avionic market, these commercial devices are not able to ensure a level of safety of operations that is sufficient for applications involving the displaying of safety critical data (e.g., they do not have a DO-254 pedigree). In other words, the DAL ("Design Assurance Level") of these devices in not enough for safely and reliably using them for displaying safety critical data. Examples of errors possibly occurring during the functioning of the COTS GPU are: permanent errors mainly caused by the manufacturing process or the aging of the COTS GPU; non-reproducible errors that may result from external factors such as ionizing radiation, electromagnetic interference (e.g. NEMP, EMI), lightning or electrostatic discharge (ESD) on the COTS GPU; intermittent errors due to aging or variation of the quality of the manufacturing process of the COTS GPU.

A number of information presented on such HMI are considered safety critical, because the pilot directly reacts to this information to operate the aircraft. A misleading information provided by the HMI may thus lead to erroneous actions performed by the pilot, with potential catastrophic consequences for the aircraft, the pilot and the surrounding environment.

In the specific case of Primary Flight Display (PFD), presentation of misleading information must be avoided on data that are considered critical from the safety standpoint.

In particular, this concept applies to the following examples of aircraft safety critical data: air speed, altitude, pitch and roll.

Ensuring avoidance of misleading information is crucial to achieve Airworthiness Certification of Primary Flight Display systems and more in general to ensure the correct control of the aircraft by the pilot.

Therefore, the need is felt to ensure that the safety critical data displayed by the HMI are correct.

SUMMARY OF THE INVENTION

An aim of the present invention is to satisfy the above-mentioned needs.

The aforementioned aim is reached by a display system, a vehicle and a method for displaying safety critical data, as claimed in the appended set of claims.

BRIEF DESCRIPTION OF DRAWINGS

For a better understanding of the present invention, a preferred embodiment is described in the following, by way of a non-limiting example, with reference to the attached drawings wherein:

FIG. 8 is a block diagram schematically representing a method for generating the confirmed video frame of FIG. 7, according to an embodiment of the present invention;

FIG. 9 is a block diagram schematically representing a vehicle comprising the display system of FIG. 1, according to an embodiment of the present invention.

DETAILED DESCRIPTION OF THE INVENTION

In the following, elements common to the different embodiments have been indicated with the same reference numbers.

Figure 1:
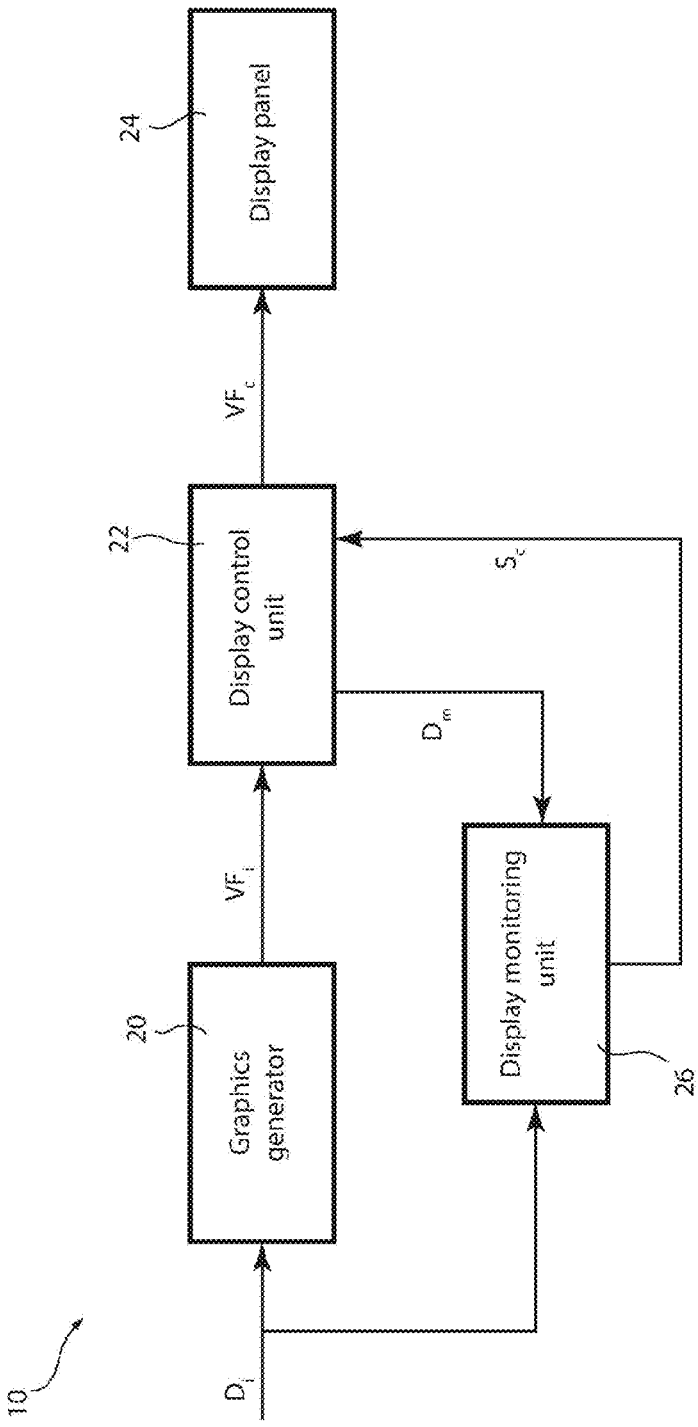
FIG. 1 is a block diagram schematically representing a display system according to an embodiment of the present invention.

FIG. 1 shows a display system (also called safe primary flight data display system) 10 that can be comprised in an aircraft, such as an airplane, a helicopter, a remote-controlled unmanned aerial vehicle or watercraft.

During use, the display system 10 provides information (in details, safety critical data and, in particular and as exemplarily considered in the following, primary flight display (PFD) data) to a pilot of the aircraft, thus allowing the pilot to control the aircraft so as to perform actions such as navigating and exploiting missions.

In details, the display system 10 is configured to implement a method for displaying safety critical data (in details and as exemplarily considered in the following, the PFD data), better discussed in the following with reference to FIG. 8. In details, the PFD data are displayed to the pilot through a video.

The following description relates to the processing of a single frame, although it is evident that the PFD data can be displayed frame-by-frame by repeating several times the following actions to generate a corresponding video, each frame being indicative of respective updated PFD data.

The display system 10 comprises a graphics generator 20, a display control unit 22, a display panel 24 and, optionally, a display monitoring unit 26, operatively coupled together.

The display panel 24 is a per se known display element such as an LCD panel and is used to display the PFD data to the pilot (i.e., to display the frames forming said video).

The display system 10 is coupled to sensors of the aircraft that are external to the display system 10 and that, during use of the aircraft, measure the PFD data indicative of a working status or quantities of the aircraft (i.e., of operative parameters of the aircraft).

The graphics generator 20 acquires one or more of these measured PFD data (in the following also called input PFD data or input data $D_i$) from the aircraft and generates an intermediate video frame signal indicative of (i.e., encoding) an intermediate video frame $VF_i$, based on the input data $D_i$. In the following, the exemplary case of a plurality of input data $D_i$ is considered for illustrative and non-limiting purposes.

In particular, the input data $D_i$ are data indicative of quantities of interest of the aircraft, more in particular of parameters/symbols critical for the safety of the aircraft (i.e., of critical symbols input data).

In details, the input data $D_i$ are the primary flight display (PFD) data. For example, the input data $D_i$ comprise one or more of the following data: air speed (i.e., the speed of the aircraft relative to the air), altitude of the aircraft (e.g., measured relative to the ground below the aircraft, or to the mean sea level), pitch and roll angles of the aircraft. In the following, reference is made to the exemplary and non-limiting embodiment in which the input data $D_i$ comprise the air speed, the altitude and the pitch and roll angles (in the following also called, respectively, input air speed, input altitude and input pitch and roll); nevertheless this is only considered for exemplary purposes and it is evident that the input data $D_i$ can comprise any subset of these data as well as other PFD data.

In particular, the graphics generator 20 comprises a COTS GPU or any other known device (e.g., Raster Controller device) configured to generate signals corresponding to computer graphics, i.e. video frames. In order to generate the computer graphics, the graphics generator 20 is provided with a software of per se known type, for example using a standard graphics library (e.g., OpenGL, DirectX, etc.) or a proprietary one.

Starting from the input data $D_i$, the graphics generator 20 generates the intermediate video frame $VF_i$ representing intermediate data (also called in the following monitoring data $D_m$).

The intermediate data should correspond to the received input data $D_i$. Nevertheless, if an error occurs during the processing of the input data $D_i$ by the graphics generator 20, it is possible that the intermediate data are different from the input data $D_i$ and thus the pilot must be presented with an alert signal informing him/her of this safety critical condition about the data to be shown, in order to prevent the pilot to control the aircraft based on wrong information (this can be done for example by avoiding the intermediate data to be displayed to the pilot or by displaying them together with a warning signal informing the pilot of the incorrectness of the displayed data, as better discussed in the following). In other words, the intermediate data correspond to the received input data $D_i$ if no error has occurred in the functioning of the graphics generator 20 (condition of correct working of the graphics generator 20) or do not correspond to the received input data $D_i$ if an error has occurred in the functioning of the graphics generator 20 (condition of incorrect working of the graphics generator 20).

In details, the intermediate video frame $VF_i$ is a 2D matrix of pixels, for example having N1×M1 sizes.

According to an embodiment, the intermediate video frame $VF_i$ comprises a first frame region (i.e., a first group of pixels) and a second frame region (i.e., a second group of pixels). The first frame region comprises a visual representation of the intermediate data together with encoding markers, as better discussed in the following. The second frame region encodes control data providing information about the encoding markers, in particular about how to locate and/or identify the encoding markers present in the first frame region. In details, the control data are indicative of the locations (coordinates) of the encoding markers in the first frame region (i.e., about the areas in the first frame region where the encoding markers, and thus the intermediate data, are expected to be rendered); moreover, the control data can also be indicative of additional information such as pixel colour(s) of the encoding markers and mask(s) of the encoding markers. The control data allow to properly capture and process data relevant to identify the critical symbols input data present in the first frame region of the intermediate video frame $VF_i$.

Figure 2A:
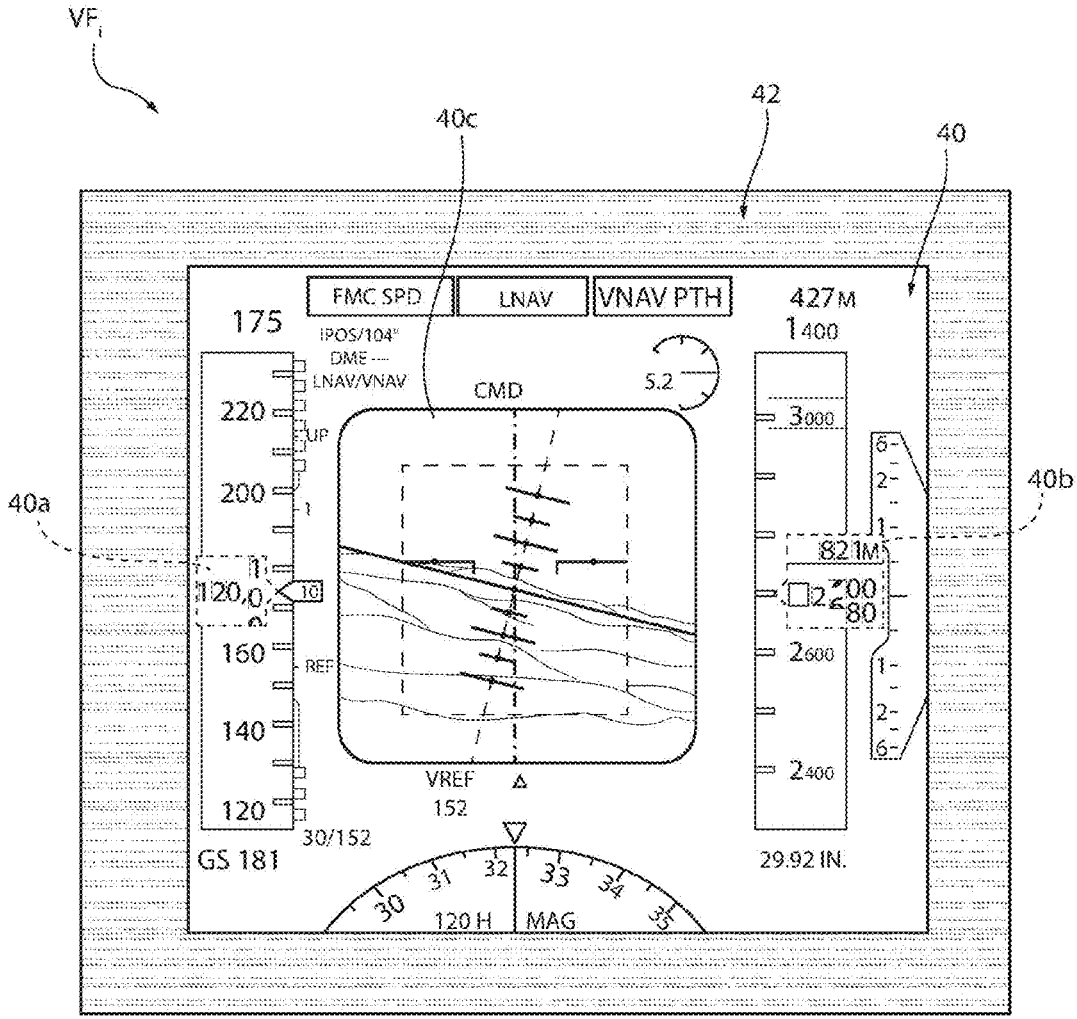
FIGS. 2A-2B are respective examples of graphics of an intermediate video frame generated by the display system of FIG. 1, according to respective embodiments.

FIG. 2A shows an example of the intermediate video frame $VF_i$ generated by the graphics generator 20. In this example, the first frame region (indicated with the reference number 40) is an inner region of the intermediate video frame $VF_i$, e.g. placed centrally in the latter, while the second frame region (indicated with the reference number 42) is an outer region of the intermediate video frame $VF_i$, e.g. placed externally with respect to the first frame region 40 (for example, surrounding the first frame region 40).

Figure 2B:
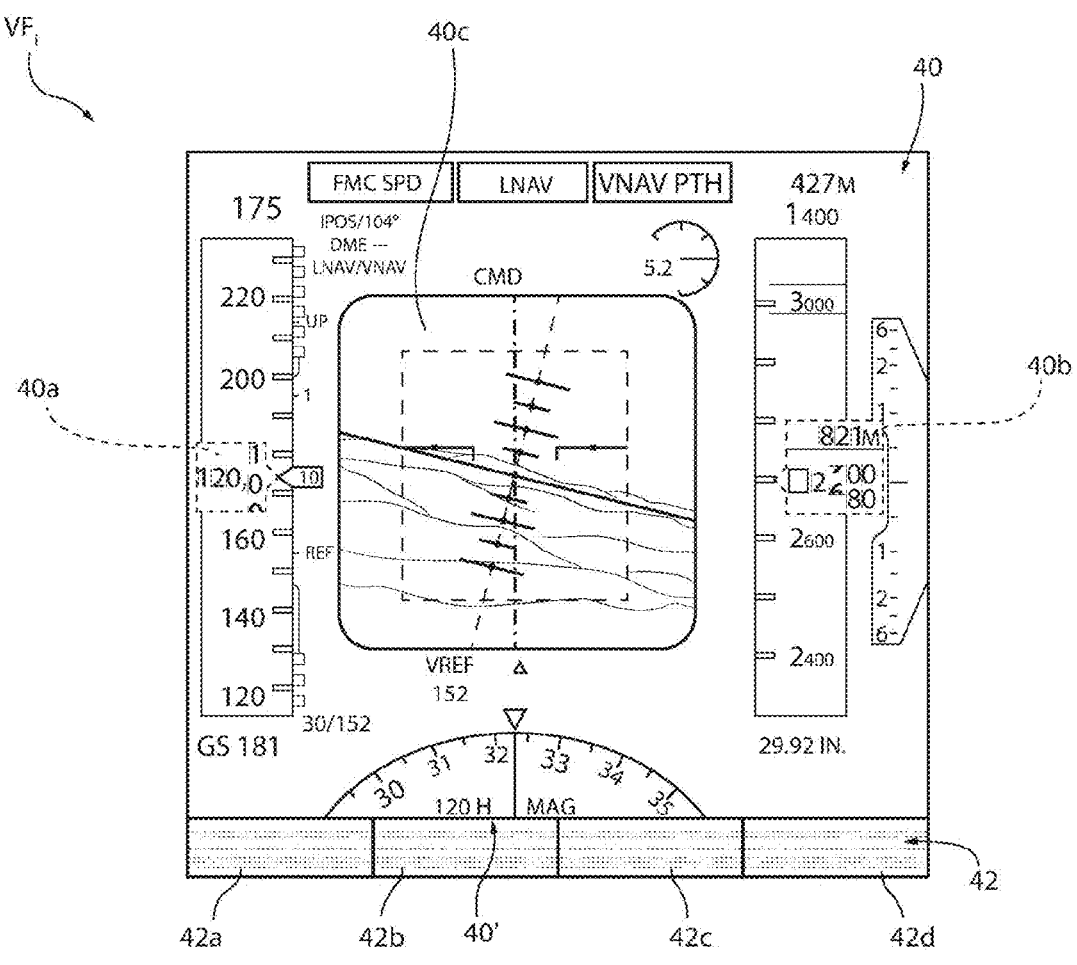

FIG. 2B shows a different example of the intermediate video frame $VF_i$ generated by the graphics generator 20. In this example, the second frame region 42 is adjacent to one side of the first frame region 40, such as the bottom side 40' of the first frame region 40.

The intermediate video frames $VF_i$ shown in FIGS. 2A-2B are only provided for exemplary and non-limiting purposes. In fact, other variants are possible, e.g. in shape and position of the second frame region 42 relative to the first frame region 40.

The second frame region 42 encodes the control data according to per se known techniques. For example, the control data are encoded by means of respective patterns of pixels in the second frame region 42. As an example, in FIG. 2A the control data are homogenously encoded in the pixels of the whole second frame region 42 while in FIG. 2B the second frame region 42 includes a plurality of sub-regions 42a-42d, each one provided with a respective pixel pattern encoding the control data relative to a respective intermediate datum (e.g., respectively an intermediate air speed, an intermediate altitude and intermediate pitch and roll angles). As another example (not shown), the control data can be encoded in the second frame region 42 through one or more bar codes or QR codes.

In the considered example shown in FIGS. 2A-2B, the first frame region 40 comprises an air speed region 40*a*, an altitude region 40*b* and a pitch and roll region 40*c* respectively displaying the values of intermediate air speed, intermediate altitude and intermediate pitch and roll of the aircraft.

These intermediate values can either correspond to (e.g., coincide with), or not correspond to (e.g., be different from), the values of the input data D*ᵢ* depending on the absence or, respectively, presence of a processing error by the graphics generator 20.

In details, each one of the air speed region 40*a*, the altitude region 40*b* and the pitch and roll region 40*c* displays both the respective PFD intermediate datum (respectively, the intermediate air speed, the intermediate altitude and the intermediate pitch and roll) and respective encoding markers encoding the intermediate datum. This allows to have redundancy of information about the intermediate data that enables to determine if the intermediate data correspond to the input data D*ᵢ*, as better discussed in the following.

In the following description, exemplary reference is made to the air speed region 40*a* to describe the displaying of a PFD intermediate datum by means of one or more digits (e.g., through digital readout), together with respective first encoding markers. Nevertheless, analogous considerations apply also to the displaying of other PFD intermediate data to be shown through digits, e.g. analogously apply to the altitude region 40*b*.

Figure 3:
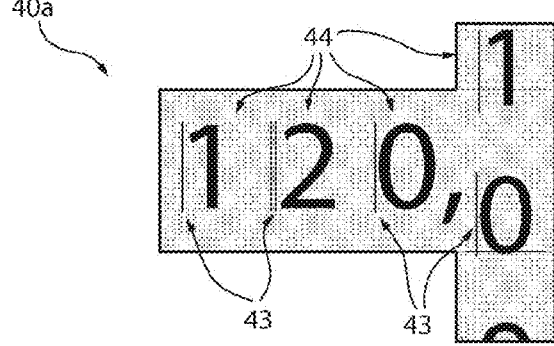
FIG. 3 is a graphics of an air speed region of the intermediate video frame of FIGS. 2A-2B, comprising first encoding markers, according to an embodiment.

An example of the air speed region 40*a* is shown in FIG. 3. In details, the air speed region 40*a* displays in digits the value of the intermediate air speed of the aircraft (in the considered example, 120.0 knots). A respective first encoding marker 43 is uniquely associated to each digit 44 of the intermediate air speed value so that the intermediate air speed value can be acquired both starting from the displayed digits 44 and from the first encoding markers 43.

Figure 4:
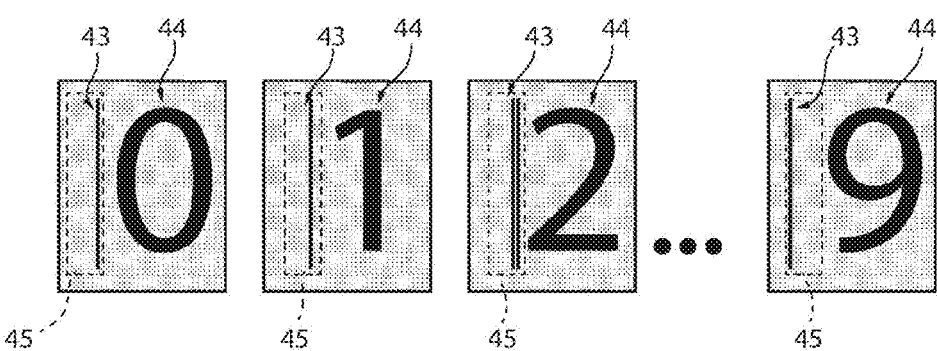
FIG. 4 comprises graphics of examples of digits that can be represented in the air speed region of FIG. 3, together with the respective first encoding markers.

As better shown in FIG. 4, each first encoding marker 43 is a pixel pattern that is uniquely associated to the respective digit 44 and is placed adjacent to the respective digit 44 (e.g., closer to the respective and associated digit 44 than to any other digit 44), for example at the left of the digit 44. In other words, the rendering of the digits 44 is performed using specific glyphs in a fontset, wherein each glyph includes pixels providing an encoding of the digit 44 itself. The encoding is unique in the fontset and is part of the glyph itself (i.e. it is not added at run-time). The encoding pixels may vary from solution to solution.

In the embodiment exemplarily shown in FIG. 4, each first encoding marker 43 is realized through a respective bar code. In details, it comprises one or more segments (e.g., vertical segments such as bars) that are located in a first predefined area (also called first capture area) 45, known from the control data and adjacent to the digit 44, and that are indicative of the respective digit 44: for example, digit 0 is associated to one vertical segment in a first position of the first predefined area 45 (e.g., a first column of pixels in the first predefined area 45), digit 1 is associated to one vertical segment in a second position of the first predefined area 45 (e.g., a second column of pixels in the first predefined area 45), digit 2 is associated to two vertical segments placed respectively in the first position and in the second position of the first predefined area 45 (e.g., the first and second columns of pixels in the first predefined area 45) and digit 9 is associated to two vertical segments placed respectively in the second position and in a third position of the first predefined area 45 (e.g., the second column and a third column of pixels in the first predefined area 45). These segments are realized for example through pixels having a first value (or colour) on a background of pixels having a second value (or colour), either in greyscale or in RGB scale. Nevertheless, it is evident that the first encoding markers 43 can be realized and placed differently, provided that they identify the respective digits 44.

Figure 5:
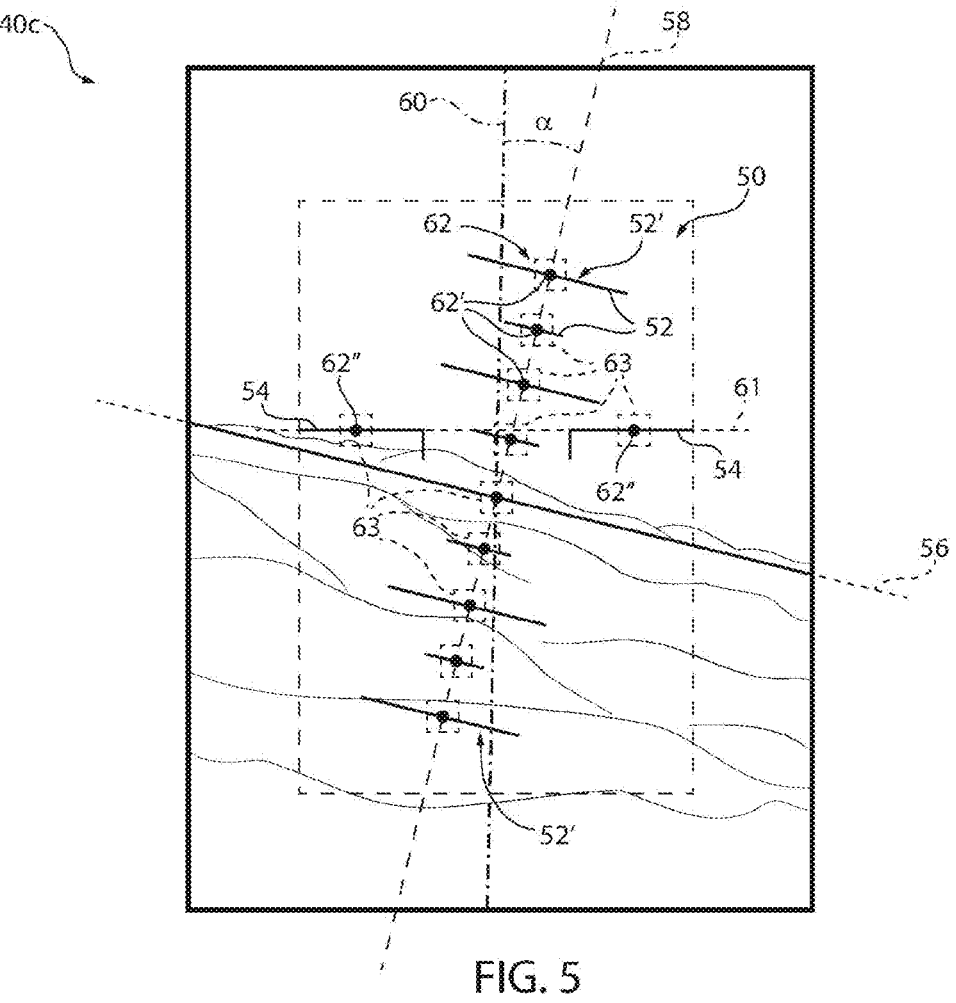
FIG. 5 is a graphics of a pitch and roll region of the intermediate video frame of FIGS. 2A-2B, comprising second encoding markers, according to an embodiment.

An example of the pitch and roll region 40*c* is shown in FIG. 5. In details, the pitch and roll region 40*c* displays an attitude indicator 50 superimposed to the field of view of the pilot (e.g., to the horizon line, indicated in FIG. 5 with the reference number 56). In details, this field of view can be for example a synthetic vision system or an artificial horizon (i.e., sky and terrain).

The attitude indicator 50 is indicative of the intermediate pitch and roll angles of the aircraft and is commonly used to present to the pilot these information. In details, the attitude indicator 50 comprises attitude bars 52 and pitch reference bars (also called aircraft bars) 54.

The attitude bars 52 are bars (i.e., segments) parallel to the horizon line 56 and between them and orthogonal to a first alignment axis 58 (orthogonal to the horizon line 56) along which the attitude bars 52 are reciprocally aligned and spaced (e.g., equally spaced or having an incremental step that increases when representing increasing intermediate pitch angles). In details, the attitude bars 52 are centred, along the first alignment axis 58, on the horizon line 56; in other words, the horizon line 56 is equally spaced with respect to extremal attitude bars 52' opposite between them along the first alignment axis 58 and forming respective ends of the group of attitude bars 52.

The pitch reference bars 54 are bars orthogonal to a reference axis 60 (vertical axis, fixed) and reciprocally aligned along a second alignment axis 61 that is orthogonal to the reference axis 60 and parallel to the pitch reference bars 54; the pitch reference bars 54 indicate the pitch axis of the aircraft and, across all the video frames, have fixed horizontal positions due to the fact that the reference system of the shown image is the one of the pilot (whereas the displayed field of view showing the landscape surrounding the aircraft changes in response to the movement of the aircraft relative to the ground).

The intermediate roll angle is the angle formed between the reference axis 60 and the first alignment axis 58 and is indicated in FIG. 5 with the reference a, whereas the intermediate pitch angle is visually represented by the reciprocal alignment of the attitude bars 52 and the pitch reference bars 54 (i.e., is deduced from which attitude bar 52 is the closest one to the second alignment axis 61). Therefore, in absence of roll angle the reference axis 60 and the first alignment axis 58 coincide and in absence of pitch angle the horizon line 56 and the second alignment axis 61 are superimposed at least in a middle point extending between the pitch reference bars 54 and equally spaced with respect to the latter.

Second encoding markers 62 are associated to the attitude indicator 50 so that the intermediate pitch and roll angles can be acquired both starting from the attitude indicator 50 relative to the displayed field of view and from the second encoding markers 62.

In details, a respective second encoding marker 62 is associated to each attitude bar 52 and pitch reference bar 54 present in the pitch and roll region 40*c* and is comprised in a second predefined area (or capture area) 63 of the pitch and roll region 40*c*, whose location is known from the control data. For example, each attitude bar 52 comprises a second attitude encoding marker 62' placed centrally with respect to the attitude bar 52, i.e. the second attitude encoding marker 62' is equally spaced from ends of the attitude bar 52 that are opposite to each other along the main direction of the attitude bar 52 (i.e., parallel to the horizon line 56), whereas each pitch reference bar 54 comprises a second pitch encoding marker 62" placed centrally with respect to the pitch reference bar 54, i.e. the second pitch encoding marker 62" is equally spaced from ends of the pitch reference bar 54 that are opposite to each other along the main direction of the pitch reference bar 54 (i.e., orthogonally to the reference axis 60). Therefore, the second attitude encoding marker 62' are reciprocally aligned along the first alignment axis 58 and the second pitch encoding marker 62" are reciprocally aligned along the second alignment axis 61.

In particular, the rendering of the second encoding markers 62 in the attitude bars 52 and the pitch reference bars 54 is performed through specific and predefined colour encoding of the one or more pixels forming each of the second encoding markers 62, so that they can be recognised among all the pixels available in the pitch and roll region 40c. For example, the rendering of the attitude bars 52 and the pitch reference bars 54 is performed by constraining the RGB values (typically encoded as hexadecimal/binary digits) of each pixel belonging to the bars 52, 54, so that: R. G. and B values of the (RGB) pixels belonging to the segment body of the bar 52, 54 are represented having the n least significant bits equal to zero; in each attitude bar 52, one pixel (marking pixel, i.e. the second attitude encoding marker 62') is positioned in the midline point (or equivalent) of the attitude bar 52 and is rendered with a colour such that its R, G, and B values are the same of the segment body of the attitude bar 52 plus a unique encoding value settled on the n least significant bits of the R, G, B triplet; and in both the pitch reference bars 54, one pixel (marking pixel, i.e. the second pitch encoding marker 62") is positioned in the midline point (or equivalent) of the pitch reference bar 54 and is rendered with a colour such that its R, G, and B values are the same of the segment body of the pitch reference bar 54 plus a unique encoding value settled on the n least significant bits of the R, G, B triplet. Using only one pixel as marking pixel is advantageous because at a given pixel resolution, as far as the "n" is sufficiently small (e.g., "n" up to four for each chromatic component R, G and B), the human eye cannot distinguish a single pixel coloured differently than the neighbour ones. Therefore, the second encoding markers 62 can be automatically detected without being distinguishable to naked eye.

With reference again to FIG. 1, it has been described that the graphics generator 20 generates the intermediate video frame $VF_i$ (i.e., the intermediate video frame signal corresponding to the intermediate video frame $VF_i$) based on the input data $D_i$. The intermediate video frame $VF_i$ comprises a visual representation of the intermediate data and of the encoding markers 43, 62 and further comprises control data that are indicative of the locations of the encoding markers in the intermediate video frame $VF_i$. The intermediate data can either correspond to the received input data $D_i$ if no error has occurred in the functioning of the graphics generator 20, or be different with respect to the received input data $D_i$ if an error has occurred in the functioning of the graphics generator 20.

The display control unit 22 is a control unit (e.g., FPGA) that is configured to acquire the intermediate video frame $VF_i$ (in details, the intermediate video frame signal) and to extract from it the monitoring data $D_m$ (i.e., the intermediate data) to be provided to the display monitoring unit 26. Moreover, the display control unit 22 is configured to acquire a command signal $S_c$ from the display monitoring unit 26 and to generate a confirmed video frame $VF_c$ or the alert signal based on the intermediate video frame $VF_i$ and the command signal $S_c$, as better discussed in the following.

In particular, the display control unit 22 decodes the control data from the second frame region 42 of the intermediate video frame $VF_i$ and, based on the control data, identifies the encoding markers 43, 62 in the first frame region 40. Then, the display control unit 22 acquires the monitoring data $D_m$ by using the encoding markers 43, 62 and outputs these monitoring data $D_m$.

In further details, the values of the digits 44 of the intermediate air speed and of the intermediate altitude are acquired by locating the first predefined areas 45 based on the control data and by decoding the first encoding markers 43 present in the first predefined areas 45 thanks to the unique relationship between each first encoding marker 43 and the respective digit 44. For example, a look-up table storing the first encoding markers 43 and the associated digits 44 can be used to obtain the values of the digits 44 starting from the respective first encoding markers 43.

On the other hand, the values of the intermediate pitch and roll angles are acquired by: locating the second predefined areas 63 based on the control data; scanning the pixels of the second predefined areas 63 to find the second encoding markers 62 (e.g., by looking for the specific and predefined colour encoding identifying the pixels forming the second encoding markers 62); determining the first alignment axis 58 and the second alignment axis 61 based on the second attitude encoding markers 62' and, respectively, on the second pitch encoding markers 62"; knowing the positions of the reference axis 60 (predefined and orthogonal to the second alignment axis 61), calculating the intermediate roll angle $\alpha$ based on the reference axis 60 and the first alignment axis 58 and calculating the intermediate pitch angle based on the relative position of the second alignment axis 61 (i.e., of the second pitch encoding markers 62") and of the attitude bars 52 (i.e., of the second attitude encoding markers 62').

The display monitoring unit 26 receives as inputs both the input data $D_i$ and the monitoring data $D_m$ determined from the encoding markers 43, 62 and generates as output the command signal $S_c$ based on the comparison of the input data $D_i$ and the monitoring data $D_m$. In particular, the command signal $S_c$ is indicative of the correspondence or not of the input data $D_i$ and the monitoring data $D_m$. In further details, the display monitoring unit 26 compares between them the input data $D_i$ and the monitoring data $D_m$ to determine if they coincide and, based on this comparison, generates the command signal $S_c$ having a correspondent value. For example, the command signal $S_c$ has a first value if the input data $D_i$ and the monitoring data $D_m$ correspond (e.g., coincide) and has a second value if the input data $D_i$ and the monitoring data $D_m$ do not correspond (e.g., do not coincide).

This correspondence can be a coincidence or, alternatively, the satisfying of a predefined reciprocal relationship between the input data $D_i$ and the monitoring data $D_m$. In the latter case, input data $D_i$ and monitoring data $D_m$ of the same type (e.g., input air speed and intermediate air speed) are considered as corresponding if a relative difference between them is lower than a respective threshold difference (to be set in a per se known way based on the type of PFD datum and other factors such as the desired accuracy of displaying of information to the pilot). More in general, in this second case the predefined reciprocal relationship is satisfied and thus the input data $D_i$ and the monitoring data $D_m$ correspond if a relative difference (e.g., Euclidean distance) between the input data $D_i$ and the monitoring data $D_m$ is lower than the threshold difference.

The display control unit 22 receives the command signal $S_c$ and generates accordingly a confirmed video frame signal indicative of (i.e., encoding) the confirmed video frame $VF_c$, or (optionally) the alert signal.

In particular, the confirmed video frame $VF_c$ is a 2D matrix of pixels, for example having N2×M2 sizes (where N2<N1 and M2<M1).

According to a preferred embodiment, the confirmed video frame $VF_c$ is free from (i.e., does not include) at least those encoding markers 43, 62 that are distinguishable to naked eye. In details, due to their structures, generally the first encoding markers 43 are visible and distinguishable to naked eye while the second encoding markers 62 are visible but not distinguishable to naked eye. In further details, each pixel or group of pixel that is displayed to the pilot is considered to be visible to naked eye, while certain conditions must be met so that this pixel or group of pixel that is displayed to the pilot is considered to be distinguishable to naked eye. These conditions are per se known. For example, a group of pixels is considered as distinguishable to naked eye by the pilot if it comprises a number of pixels greater than a threshold pixel number, where the threshold pixel number depends in a per se known way from factors such as display dots per inch, visual acuity of the pilot and colour contrast of these pixels over the background.

Figure 6:
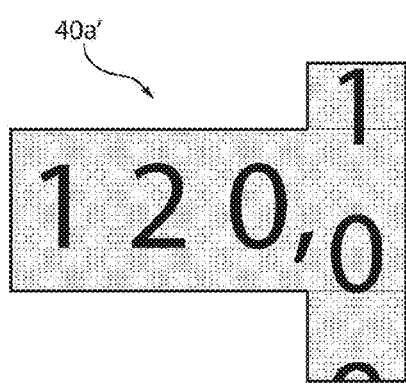
FIG. 6 is a graphics of an air speed region of a confirmed video frame further generated by the display system of FIG. 1, without the first encoding markers, according to an embodiment.
Figure 7:
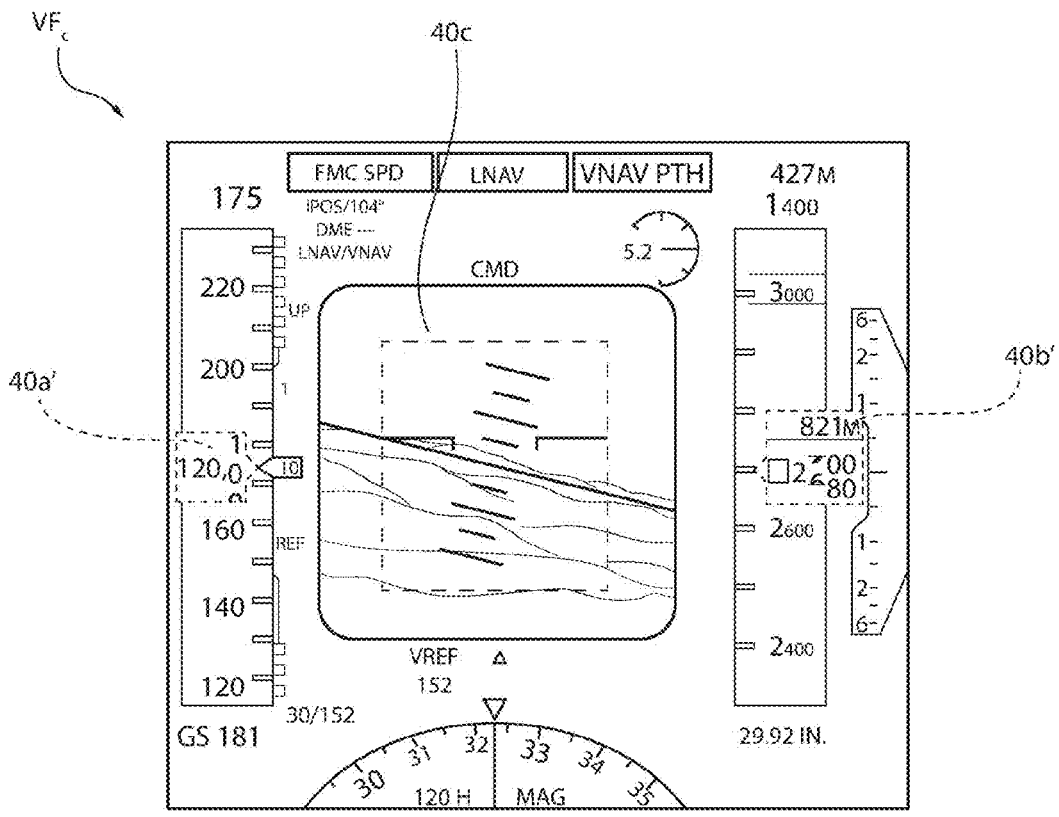
FIG. 7 is a graphics of said confirmed video frame, according to an embodiment.

In details, according to this preferred embodiment, if the command signal $S_c$ is indicative of the correspondence of the input data $D_i$ and the monitoring data $D_m$ (i.e., of the correct working of the graphics generator 20 when processing the input data $D_i$ to generate the intermediate video frame $VF_i$), the display monitoring unit 26 generates the confirmed video frame $VF_c$ that corresponds to the first frame region 40 of the intermediate video frame $VF_i$, except for the encoding markers that may be absent (all of them or part of them). In further details, in this case the display monitoring unit 26 extracts the first frame region 40 from the intermediate video frame $VF_i$ and removes the encoding markers that are distinguishable to naked eye (optionally, also the encoding markers that are indistinguishable to naked eye). For example, the first encoding markers 43 may be removed while the second encoding markers 62 may be left. An example of the air speed region of the confirmed video frame $VF_c$ after removal of the first encoding markers 43 is shown in FIG. 6 with the new reference number 40a'. The first frame region 40 processed in this way is outputted by the display monitoring unit 26 as the confirmed video frame $VF_c$. An example of the confirmed video frame $VF_c$ generated in this case is provided in FIG. 7, showing the air speed region 40a' and the altitude region 40b' without the first encoding markers 43. According to a different embodiment, the confirmed video frame $VF_c$ coincides with the first frame region 40 of the intermediate video frame $VF_i$ (i.e., it comprises the encoding markers 43, 62, also those that are distinguishable to naked eye).

On the other hand, if the command signal $S_c$ is indicative of the lack of correspondence of the input data $D_i$ and the monitoring data $D_m$ (i.e., of the incorrect working of the graphics generator 20 when processing the input data $D_i$ to generate the intermediate video frame $VF_i$), the display monitoring unit 26 can generate said alert signal informing the pilot of the lack of reliability of the PFD data to be displayed.

The alert signal can comprise the confirmed video frame $VF_c$ having a graphics configured to warn the pilot about this safety critical condition about the PFD data to be displayed: for example, the confirmed video frame $VF_c$ can be a graphics not showing any intermediate data (e.g., can be a graphics with pixels having all the same colour value so that no information is provided to the pilot) or can be the first frame region 40 of the intermediate video frame $VF_i$ without the distinguishable encoding markers and further comprising a warning signal (e.g., a red cross or equivalent sign placed across the confirmed video frame $VF_c$ or over the incorrectly displayed intermediate data, a written message or a visual warning such as a specific area of the confirmed video frame $VF_c$ that is coloured with a specific colour designed to inform the pilot about the safety critical condition, e.g. coloured in red).

Alternatively or in addition to the above, the alert signal can comprise a warning signal that is provided to the pilot by means of an external alerting means (e.g., an indicator light such as a LED, or a speaker, placed in a cockpit of the aircraft) not shown and external to the display system 10 but operatively coupled to it. For example, in this case the display monitoring unit 26 can generate the confirmed video frame $VF_c$ (in the form of a graphics not showing any intermediate data or in the form of the first frame region 40 of the intermediate video frame $VF_i$ without the distinguishable encoding markers, i.e. exactly as it would do in case the safety critical condition did not occur) and, in addition to this, generates said warning signal in the form of a warning provided by means of the external alerting means operatively coupled to the display monitoring unit 26.

The display panel 24 then receives the confirmed video frame $VF_c$ and displays it to the pilot.

In general, the graphics generator 20, the display control unit 22 and the display monitoring unit 26 are control units such as FPGA, dedicated controllers or CPU. Optionally, the display control unit 22 and the display panel 24 form a display means (not shown) of the display system 10.

FIG. 8 shows the method 100 for displaying PFD data with improved reliability (i.e., for generating the confirmed video frame $VF_c$), implemented by the display system 10.

In details, a single iteration of the method 100 is here described and corresponds to a single frame of the video displayed by the display panel 24. Nevertheless, it is evident that, by repeating these steps several times, the display panel 24 can display a video visually representing the time variation of the PFD data.

Moreover, the details of the following steps that have already been discussed previously are not repeated again in the following, for sake of conciseness.

At a step 110 of the method 100, the input data $D_i$ are acquired by the graphics generator 20.

At a step 112 consecutive to step 110, the intermediate video frame signal indicative of the intermediate video frame $VF_i$ is generated by the graphics generator 20 based on the input data $D_i$.

At a step 114 consecutive to step 112, the monitoring data $D_m$ are determined (e.g., extracted) from the intermediate video frame $VF_i$ by the display control unit 22.

At a step 116 consecutive to step 114, the monitoring data $D_m$ and the input data $D_i$ are reciprocally compared by the display monitoring unit 26 to determine if they correspond or not.

At a step 118 consecutive to step 116, the command signal $S_c$ is generated by the display monitoring unit 26 based on the reciprocal correspondence or not of the monitoring data $D_m$ and the input data $D_i$.

At a step 120 consecutive to step 118, the confirmed video frame VF$_c$ or (optionally) the alert signal is generated by the display control unit 22 based on the command signal S$_c$ and the intermediate video frame VF$_i$. In details, if the monitoring data D$_m$ and the input data D$_i$ reciprocally correspond, the confirmed video frame VF$_c$ visually representing the input data D$_i$ is generated to be displayed to the pilot; on the other hand, if the monitoring data D$_i$ and the input data D$_i$ do not reciprocally correspond, the alert signal is generated to inform the pilot about the impossibility to display reliable PFD data.

At a step 122 (optional) consecutive to step 120, the confirmed video frame VF$_c$ is displayed to the pilot through the display panel 24 or, optionally, the alert signal is presented to the pilot as previously discussed, depending on the command signal S$_c$.

In view of the foregoing, the advantages of the display system 10 and of the method 100 according to the invention are apparent.

The display system 10 avoids presentation of misleading information to the pilot, by enabling an effective independent monitoring technique of safety critical data presented on the HMI, with special focus on the aircraft primary flight data (air speed, altitude, pitch and roll angles). In details, this solution monitors the video frame output by the GPU (or Raster Controller device) and verifies the correctness of the safety critical data within the video itself so that also a common COTS GPU (instead of a custom device) can be safely used to generate graphics for a Primary Flight Display.

Moreover, the critical symbols/data are checked directly on the video stream produced by the COTS GPU (or Raster Controller device). Therefore, there is no need of drawing additional symbols/patterns dedicated to the monitoring in a non-visible area (i.e. in an extra area of the video buffer or video frame), not directly related to the displayed video.

Furthermore, using the encoding markers 43, 62 to determine the monitoring data D$_m$ has the advantage that the encoding markers 43, 62 have smaller sizes than the respective digits 44 or bars 52, 54 to which they are associated. In other words, they are codified in less pixels than the digits 44 and bars 52, 54. Therefore, with respect to the digits 44 and bars 52, 54, a lower computational cost is required to process the encoding markers 43, 62 to determine the monitoring data D$_m$.

It is clear that modifications can be made to the described display system 10 and to the method 100, which do not extend beyond the scope of protection defined by the claims.

For example, the same solution and technique can be employed not only in the HMI of aircraft cockpits but also on other domains where data presented on a display must be monitored to avoid misleading information, such as in automotive displays, industrial control panels, etc. In general, this invention can be used to monitor critical data displayed on graphics produced with a COTS GPU in any field of application (automotive, industrial, etc.).

Therefore, as shown in FIG. 9, the display system 10 can be comprised in a vehicle 150 which makes use of instrumental assistance for navigation or safety critical missions (e.g., aircrafts such as airplane, helicopter, unmanned aerial vehicle and also watercrafts such as submarine, hovercraft, and final, but not limited to, modern rescue drones). The vehicle 150 is of general type, can be operated by a user (e.g., the pilot) and can further comprise sensors 152 coupled to the display system 10 and configured to acquire the input data D$_i$. In principle the display system 10 and the method 100 are applicable to any use case in which the displayed data are used by the user in order to select, choose and perform specific actions on or by means of the vehicle 150.

Moreover, the control data can be provided from the graphics generator 20 to the display control unit 22 separately with respect to the intermediate video frame VF$_i$, e.g. through a separate communication channel and not as data embedded in the intermediate video frame VF$_i$. According to this embodiment, the intermediate video frame VF$_i$ only comprises the first frame region 40 and does not comprise the second frame region 42 encoding the control data, which are sent to the display control unit 22 independently from the intermediate video frame VF$_i$ (e.g., in parallel with respect to the intermediate video frame VF$_i$, i.e. in a synchronised way with respect to the latter).

The invention claimed is:

1. A display system for a vehicle operable by a user, the display system comprising:

a graphics generator configured to acquire input data indicative of one or more operative parameters of the vehicle and generate, based on the input data, an intermediate video frame signal indicative of an intermediate video frame, wherein the intermediate video frame comprises a first frame region that is a visual representation of monitoring data and that includes encoding markers uniquely associated to the monitoring data, wherein the monitoring data and the input data reciprocally correspond in a condition of correct working of the graphics generator and do not reciprocally correspond in a condition of incorrect working of the graphics generator;

a display control unit coupled to the graphics generator and configured to receive the intermediate video frame signal and determine the monitoring data based on the encoding markers;

a display monitoring unit coupled to the display control unit and configured to receive both the input data and the monitoring data determined from the encoding markers, reciprocally compare the input data and the monitoring data and generate a command signal based on said comparison, the command signal being indicative of the correspondence, or of the lack of correspondence, between the input data and the monitoring data, wherein the display control unit is further configured to receive the command signal and, based on the command signal and the intermediate video frame, if the input data and the monitoring data correspond, generate a confirmed video frame signal indicative of a confirmed video frame that is configured to be displayed to the user and that is a visual representation of the monitoring data, a display panel coupled to the display control unit and configured to receive the confirmed video frame signal and, if the input data and the monitoring data correspond, display the confirmed video frame to the user, wherein the display control unit is further configured to, if the input data and the monitoring data do not correspond, generate an alert signal configured to be provided to the user to inform the user of said condition of incorrect working of the graphics generator, wherein the display panel is further configured to receive the alert signal and display it to the user if the input data and the monitoring data do not correspond, wherein the graphics generator is further configured to generate control data indicative of the location of the encoding markers in the first frame region of the intermediate video frame, and wherein the display control unit is further configured to receive the control data and identify the encoding markers in the first frame region based on the control data in order to determine the monitoring data based on the encoding markers by decoding the encoding markers.

2. The display system according to claim 1, wherein the graphics generator is configured to generate the control data either separately from the intermediate video frame signal or as encoded in a second frame region of the intermediate video frame, placed in the intermediate video frame adjacent to the first frame region.

3. The display system according to claim 1, wherein the vehicle is an aircraft, the input data comprise input primary flight display (PFD) data and the monitoring data comprise monitoring PFD data.

4. The display system according to claim 3, wherein the monitoring PFD data comprise one or more data that are visually represented in the intermediate video frame each through one or more respective digits, wherein a respective first encoding markers of the encoding markers is uniquely associated to each digit, each first encoding marker being a specific and predefined pixel pattern in the first frame region of the intermediate video frame.

5. The display system according to claim 4, wherein each first encoding marker is a respective bar code or QR code.

6. The display system according to claim 3, wherein the monitoring PFD data comprise a monitoring pitch angle and/or a monitoring roll angle visually represented in the intermediate video frame through an attitude indicator comprising attitude bars and pitch reference bars, wherein second encoding markers of the encoding markers are uniquely associated to the attitude indicator and comprise second attitude encoding markers and second pitch encoding markers, each second attitude encoding marker being comprised in one respective attitude bar and each second pitch encoding marker being comprised in one respective pitch reference bar so that the relative positions of the second attitude encoding markers and of the second pitch encoding markers is indicative of the monitoring pitch angle and/or of the monitoring roll angle.

7. The display system according to claim 6, wherein each second encoding marker comprises one or more pixels in the first frame region of the intermediate video frame, with predefined colour encoding.

8. The display system according to claim 1, wherein the intermediate video frame is free from the encoding markers that are distinguishable to naked eye by the user.

9. A vehicle comprising the display system according to claim 1.

10. The vehicle according to claim 9, said vehicle being an aircraft and the user being a pilot of the aircraft.

11. The vehicle according to claim 9, further comprising one or more sensors coupled to the display system and configured to measure the input data.

12. The vehicle according to claim 9, wherein the display control unit is further configured to, if the input data and the monitoring data do not correspond, generate an alert signal configured to be provided to the user to inform the user of said condition of incorrect working of the graphics generator, the vehicle further comprising alerting means coupled to the display system and configured to receive the alert signal and provide it to the user if the input data and the monitoring data do not correspond.

13. A method for displaying to a user of a vehicle a confirmed video frame indicative of one or more operative parameters of the vehicle operable by the user, the method being executed by a display system comprising a graphics generator, a display control unit, a display panel and a display monitoring unit operatively coupled between them, the method comprising:

acquiring, by the graphics generator, input data indicative of said one or more operative parameters of the vehicle;

generating, by the graphics generator and based on the input data, an intermediate video frame signal indicative of an intermediate video frame, wherein the intermediate video frame comprises a first frame region that is a visual representation of monitoring data and that includes encoding markers uniquely associated to the monitoring data, wherein the monitoring data and the input data reciprocally correspond in a condition of correct working of the graphics generator and do not reciprocally correspond in a condition of incorrect working of the graphics generator;

determining, by the display control unit, the monitoring data based on the encoding markers;

reciprocally comparing, by the display monitoring unit, the input data and the monitoring data;

generating, by the display monitoring unit and based on said comparison, a command signal indicative of the correspondence, or of the lack of correspondence, between the input data and the monitoring data;

based on the command signal and the intermediate video frame, if the input data and the monitoring data correspond, generating by the display control unit a confirmed video frame signal indicative of said confirmed video frame to be displayed to the user and that is a visual representation of the monitoring data;

receiving, through the display panel, the confirmed video frame signal;

if the input data and the monitoring data correspond, displaying, through the display panel, the confirmed video frame to the user;

if the input data and the monitoring data do not correspond, generate, through the display control unit, an alert signal configured to be provided to the user to inform the user of said condition of incorrect working of the graphics generator; and through the display panel, receiving the alert signal and displaying it to the user if the input data and the monitoring data do not correspond, generating, by the graphics generator, control data indicative of the location of the encoding markers in the first frame region of the intermediate video frame;

receiving, by the display control unit, the control data; and identifying, by the display control unit and based on the control data, the encoding markers in the first frame region in order to determine the monitoring data based on the encoding markers by decoding the encoding markers.

14. The method according to claim 13, wherein reciprocally comparing the input data and the monitoring data comprises verifying if the input data and the monitoring data satisfy a predefined reciprocal relationship, said predefined reciprocal relationship being satisfied if the input data and the monitoring data coincide between them or if a relative difference between the input data and the monitoring data is lower than a threshold difference, the input data and the monitoring data corresponding if said predefined reciprocal relationship is satisfied and lacking correspondence if said predefined reciprocal relationship is not satisfied.

\* \* \* \* \*